March 15, 1949.    C. F. KRAMER    2,464,406
WEATHERSTRIP MOLDING
Filed April 7, 1945
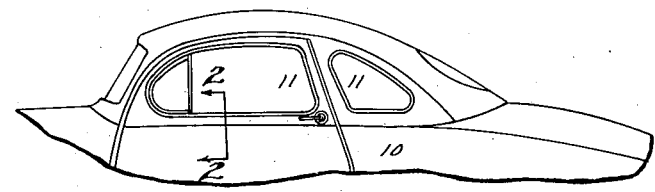
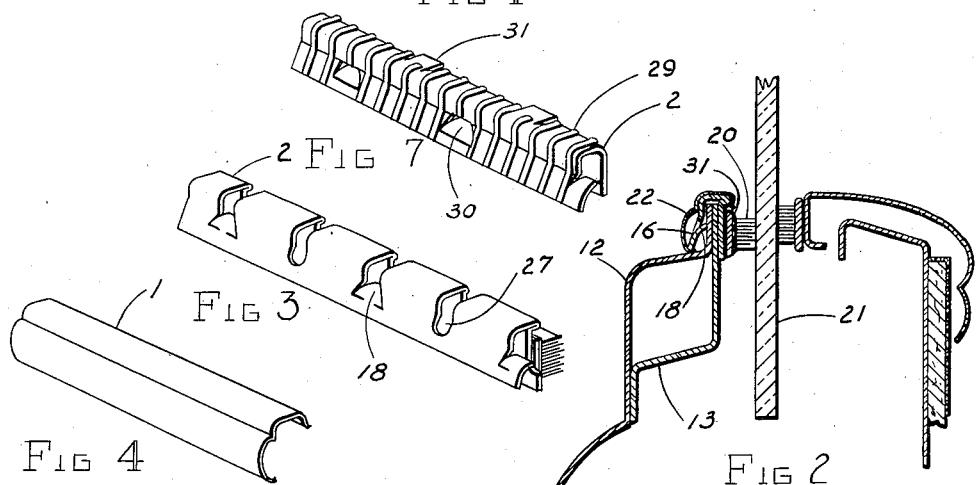
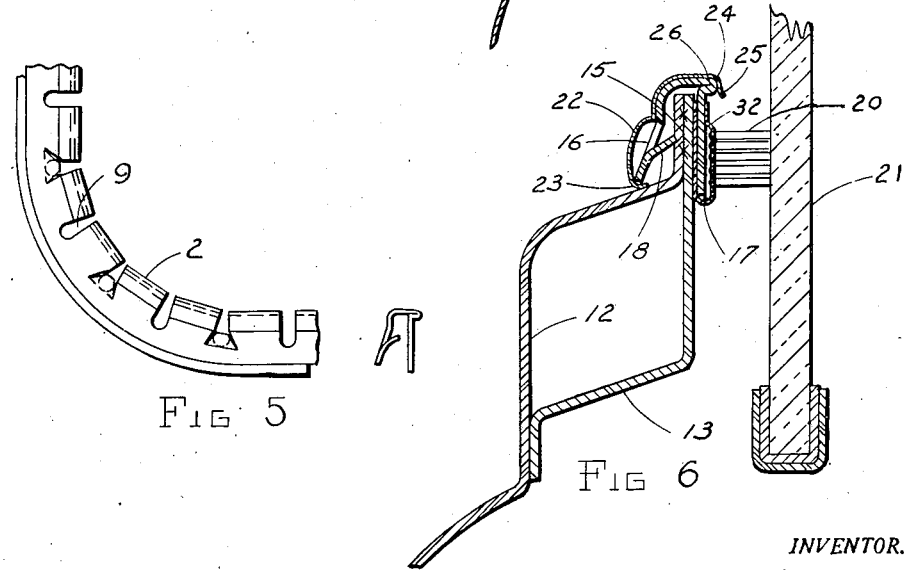
INVENTOR.
Clarence F. Kramer.
BY
Harness, Dickey & Pierce
ATTORNEYS.

Patented Mar. 15, 1949

2,464,406

UNITED STATES PATENT OFFICE 2,464,406

WEATHER STRIP MOLDING

Clarence F. Kramer, Birmingham, Mich.

Application April 7, 1945, Serial No. 587,046

4 Claims. (Cl. 296—44.5)

The invention generally relates to a combined window glass weatherstrip and window opening flange cover molding and an attaching means for the same which is especially adapted for use in connection with motor vehicles.

Heretofore, moldings and weatherstrips have been provided wherein the weatherstrip and the decorative molding were fastened to the welding flange separately with individual fastening means. This method was costly and made necessary the use of comparatively deep molding sections so that the screw ends securing the weatherstrip would have sufficient clearance. According to the present invention a weatherstrip member is provided which is so shaped that it provides a base for a decorative cover member or molding. This cover member may be snapped or crimped in place and only one means of attachment to the welding flange is thereby required to secure both members in place. It is thus possible to use very shallow molding sections with this new combined structure which is often times desirable from a design standpoint. Additionally the fastening means replaces screws, nails, staples and similar means now used to secure weatherstrips to the welding flange, thereby reducing the cost of assembly and also eliminating the possibility of screw or nail heads protruding above the weatherstrip pile causing glass breakage and rattles.

An object of the invention therefore is to provide a combined window glass weatherstrip and window opening flange cover molding, especially suitable for use on the welding flanges along the window openings of a motor vehicle body, and to provide a weatherseal between such flange and the adjustable or sliding window glass of the body.

Another object of the invention is to provide a decorative molding to cover the unsightly and sharp edges of the window opening welding flange.

Another object of the invention is to provide a fastening means for a window opening weatherstrip which is contained in and is a part of the weatherstrip structure.

Another object of the invention is to provide a weatherstrip section that is corrugated, notched or slotted in such manner, that it can be formed or bent to the contour of the window opening flange readily, with a minimum of sectional deformation.

With these and other objects in view, the invention consists in the arrangement, construction and combination of the various parts of the improved construction, as described in the specification, claimed in the claims, and illustrated in the accompanying drawings in which;

Figure 1 is the side view of a motor vehicle having an improved weatherstrip and flange cover molding constructed according to one form of the invention;

Fig. 2 is a sectional view on a larger scale taken upon line 2—2 of Fig. 1 showing the weatherstrip and flange cover molding installed;

Fig. 3 is a sectional view, taken in perspective, of the weatherstrip;

Fig. 4 is a sectional view, taken in perspective, of the cover molding;

Fig. 5 is a side view of the weatherstrip, showing a radial bend therein, within the plane of the window opening welding flange;

Fig. 6 is an enlarged sectional view through the outer body panel structure and window glass, with the weatherstrip and cover molding installed thereon; and, Fig. 7 is a sectional view, taken in perspective, of a corrugated design metal U weatherstrip shown as an alternate for the slotted or notched design shown in Fig. 3.

Referring to the accompanying drawings, the body of a motor vehicle is indicated at 10 and a window opening therein is indicated at 11. The body 10 is provided with outer panels 12 and reinforcing angles 13 that are welded to each other so as to form a welding flange 15 shown in Fig. 6. When the vehicle design requirements necessitate the use of narrow welding flanges in the window openings and comparatively shallow decorative cover moldings therefor such as the molding illustrated in Fig. 2, it can be readily understood that considerable difficulty will arise if the present or usual methods of fastening weatherstripping to the flange with screws, nails or staples, are used, due to the limited fastening and clearance areas provided.

According to the present invention, a weatherseal is provided which comprises a U shaped metal strip 16 having a weatherpad 17 secured to its inner flange or leg, and inwardly struck retainer prongs 18 incorporated in the outer flange or leg as illustrated in Fig. 6. The weatherpad 17 includes a soft pile or felt material 20 which contacts and seals against the window glass indicated at 21, and this material is secured to a light weight cloth or similar material that is adhered to the inner flange of the metal U strip, as illustrated in Fig. 6. This U shaped metal strip straddles the welding flange 15 of the body panel in the window opening and is retained in place thereon by the prongs 18 which are directed inwardly and are so located that the prong ends bite into the welding flange thereby securing the U strip to the welding flange.

The decorative molding for concealing the strip 16 is indicated at 22 and is C shape in cross-section. Its one edge indicated at 23 is hooked under the outer edge of the outer leg of strip 16 while its other edge indicated at 24 is snapped or sprung over the base or reverse bend in the strip. For facilitating the application of the molding, its edge 24 is flared outwardly to provide a lead 25 so that in snapping or springing this edge of the molding over the strip 16, the lead 25 will cause the molding to spread or open as it is pressed over the strip until its lead snaps over against the inner leg of the strip. It will be noted that the base of strip 16 is shaped to provide a head 26 along or on the inner leg which co-operates with the edge or lead 25 of the molding to anchor the latter in place. Attention is also directed to the fact that the base portion of the molding and the base or bent portion of the strip 16 substantially fit so that the molding is held tightly in place and is not loose.

To facilitate the preforming or in some instances the hand bending of the metal U strip 16, slots or notches 27 are provided at intervals crosswise of the base of the U strip and these slots extend part way down the side flanges or legs as shown as illustrated in Fig. 3. The width, depth, and spacing of the slots or notches determines the degree of bend that can be made with a minimum of deformation in the cross-section of the metal U strip. Fig. 5 illustrates the deformation that takes place in the cross slots when the U strip 16 is bent radially in a plane parallel to its inside flange. It will be observed that the prongs 18, shown in Fig. 3, are formed during cutting or notching of the slots in the outside flange of the U strip at intervals as required, but the prongs can however, be pierced out of any part of the outside flange area of U channel, consistent with the locking function of the prongs, without detracting from the efficiency of the final installation.

In assembling the weatherseal and cover molding to the window opening welding flange, the preshaped U section weatherseal is straddle-mounted over the flanges and pressed firmly down thereon. The cover molding is then applied by first linearly sliding the lower edge of the C section along the lower edge of the U strip and thereafter springing the inner end of the C section over the base of the U section. In other words, an end of the molding may be moved linearly over the U strip with the lower edge of the molding hooked over the lower edge of the outer leg of the U strip and then after the molding is in desired linear position, its upper edge may be snapped or sprung over the base of the U strip. Also, if desired, the one edge of the molding could be hooked under the outer leg and then laterally sprung over the base of the U strip.

In the structure shown by Fig. 7, the U shape strip instead of having slots, is formed with corrugations 29 which facilitate bending of the strip. Prongs 30 are struck out from the outer leg or flange between groups of corrugations and act in the same way as prongs 18 to hold the strip in place. Instead of forming a head 26 for engaging the molding, prongs 31 are struck out from the base of the strip and the free edges of these prongs serve to hold the upper edge of the molding. While not shown, a weatherseal strip is to be fastened to the inner leg of the strip in this structure in the same manner as disclosed in connection with Fig. 3.

It may be observed that the weatherpad 20 in Fig. 2 is fastened to a cloth or other flexible strip 31, in turn fastened in any suitable way to the inner leg of the strip 16, whereas, in Fig. 6, the weatherpad is fastened to one leg of a folded cloth or flexible strip 32 which embraces and is fastened to the inner leg of the strip 16. Such cloth or flexible strips may be cemented to the leg of strip 16 so as to remain attached thereto.

Among the many advantages arising from the use of the improved construction, the most important is probably the ease of assembly and the resultant savings in time and materials.

Another advantage of this construction is that very shallow molding sections can be used because no clearance need be provided for the fastening screws or nails. Further, the elimination of the screws and nails as a fastening means produces a neater and more finished installation, and also avoids the possibility of nail or screw heads protruding above the weatherpad surface thereby causing rattling and glass breakage.

Some changes may be made in the arrangement, construction and combination of the various parts of the improved construction without departing from the spirit of the invention, and it is intended to cover, by the claims, such changes as may reasonably be included within the scope thereof.

What is claimed is:

1. An article of manufacture adapted to be applied to a welding flange or the like along the edge of a window opening comprising a U shape strip adapted to straddle the flange, a glass contacting and sealing material fastened to the outer face of one leg of the strip, and anchoring prongs struck inwardly from the other leg and adapted to bite into the flange to hold the strip in place, said strip being provided with transverse slots cut through its base at intervals to facilitate bending of the strip and the prongs projecting inwardly from the ends of certain of the slots.

2. In combination with a welding flange or the like along the margin of a window opening, a U shape metal weather-seal retainer straddling the flange so that the legs of the retainer extend over both sides of the flange, a sealing material on the outer surface of the inner leg of the retainer, and a C shape molding having one edge engaged under the outer edge of the outer leg of the retainer and having its other edge sprung over the base portion of the retainer.

3. In combination with a welding flange or the like along the margin of a window opening, a U shape metal weather-seal retainer stradding the flange so that the legs of the retainer extend over both sides of the flange, a sealing material on the outer surface of the inner leg of the retainer, inwardly pierced prongs projecting inwardly from the outer leg of the retainer and engaging the flange to hold the retainer in place, and a C shape molding having one edge engaged under the outer edge of the outer leg of the retainer and having its other edge sprung over the base of the retainer.

4. In combination with a welding flange or the like along the margin of a window opening, a U shape metal weatherseal retainer straddling the flange so that the legs of the retainer extend over both sides of the flange, a sealing material on the outer surface of the inner leg of the retainer, inwardly pierced prongs projecting inwardly from the outer leg of the retainer and engaging the flange to hold the retainer in place, and a C shape molding having one edge engaged under the outer edge of the outer leg of the retainer and having its other edge sprung over the base of the retainer, the prongs being angled towards the base of the retainer so that they tend resiliently to bite into the flange and prevent removal of the retainer.

CLARENCE F. KRAMER.

REFERENCES CITED

The following references are of record in the file of this patent:

UNITED STATES PATENTS

| Number | Name | Date |
| --- | --- | --- |
| 1,688,371 | Bailey | Oct. 23, 1928 |
| 2,192,651 | Rydquist | Mar. 5, 1940 |
| 2,196,888 | Bailey | Apr. 9, 1940 |

FOREIGN PATENTS

| Number | Country | Date |
| --- | --- | --- |
| 441,948 | Great Britain | Jan. 30, 1936 |